Patented Aug. 8, 1950

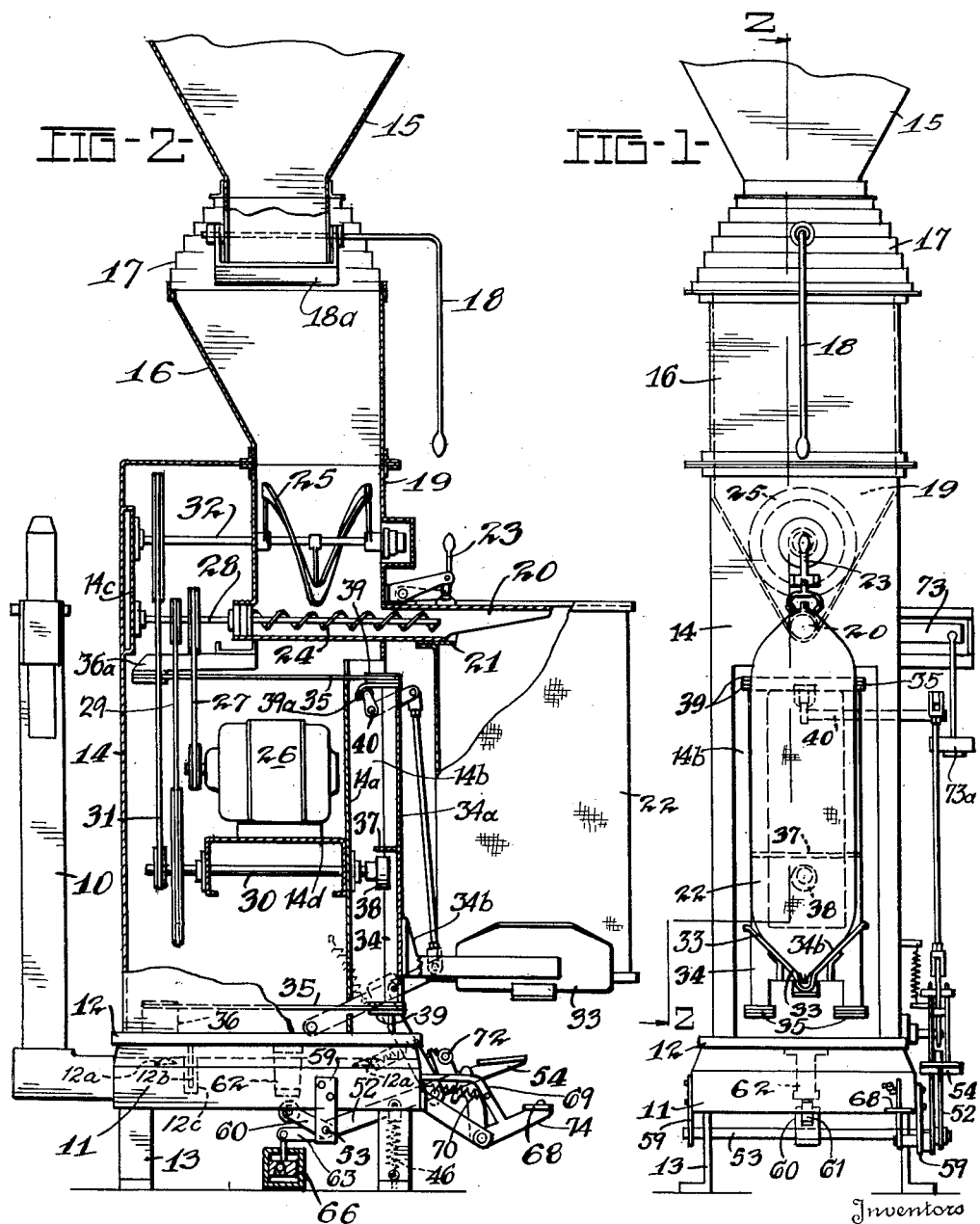

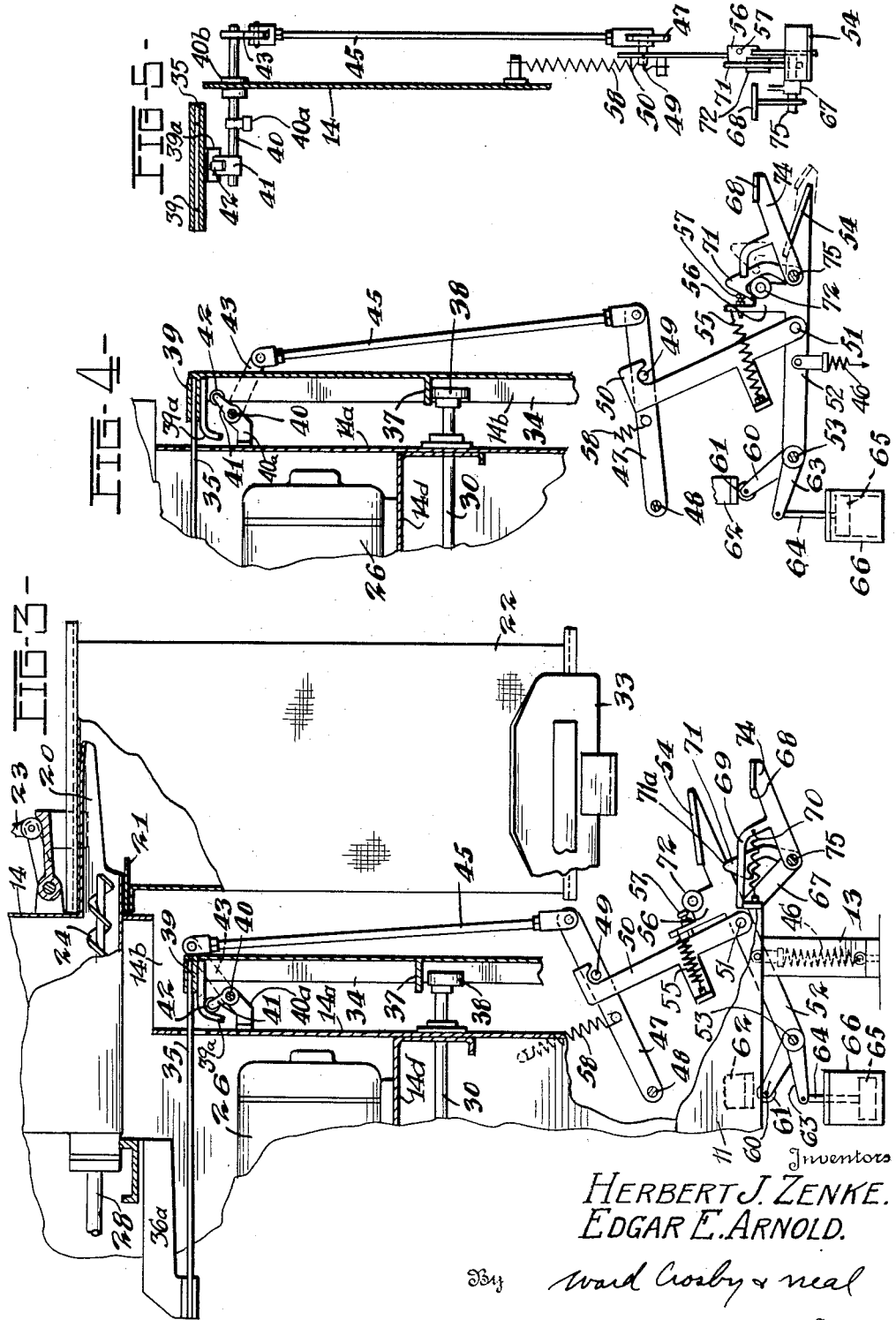

2,517,954

UNITED STATES PATENT OFFICE 2,517,954

BAG FILLING AND WEIGHING APPARATUS

Herbert J. Zenke, Oswego, N. Y., and Edgar E. Arnold, Chicago, Ill., assignors to St. Regis Paper Company, New York, N. Y., a corporation of New York Application March 1, 1945, Serial No. 580,467

9 Claims. (Cl. 226—47)

This invention relates to a power-driven machine comprising apparatus by means of which pulverized, granular and other loose or rubble-like materials may be expeditiously loaded, compactly packed and accurately weighed into a container.

The invention provides simple and compact apparatus of this description whereby material is loaded into a container and is constantly jigged therein during the loading operation.

The apparatus also has provision for weighing the contents of a container after it is thus loaded, without moving it from its loading position, and means are provided for protecting the weighing apparatus from shock and vibratory stresses during the jigging operation.

According to a further feature of the invention, a manually-operable mechanism is provided for jointly controlling the above-mentioned jigging apparatus and protective means, so that both may be rendered effective simultaneously or the container allowed to remain quiescent during the final stages of the weighing operation.

Various further and more specific objects, features and advantages of the invention will more clearly appear from the detailed description given below taken in connection with the accompanying drawings which form a part of this specification and illustrate merely by way of example a preferred form of apparatus for practicing the invention. The invention consists in such novel features as are disclosed and described hereinafter.

In the drawings:

Figure 1 is a front elevational view of one form of machine comprising apparatus embodying the invention;

Fig. 2 is a transverse vertical sectional view of the machine shown in Fig. 1, taken in the plane 2—2 looking in the direction of the arrows; some parts being shown in elevation;

Fig. 3 is an enlarged view of a portion of Fig. 2; some parts being broken away, while others are in section or elevation;

Fig. 4 is a view of a portion of Fig. 3, showing parts in different position, and Fig. 5 is a front elevational view, partly in section, of a portion of the mechanism shown in Fig. 4.

As shown in the accompanying drawings, a preferred form of the invention comprises an ordinary type of scale 10 having a base or foundation 11, an indicating balance beam 13, and a platform 12 adapted to support a load to be weighed. The base 11 is mounted on feet or angles 13 which are designed for attachment to a floor or other firm support.

Mounted on platform 12 of scale 10 and secured thereto by any convenient means is a sheet-metal frame or casing 14 of generally rectangular shape, having an inwardly extending offset wall or plate 14—a on its right-hand side, Fig. 2, forming a shallow recess 14—b. A sheet-metal chute 16 is secured to said casing, and extends into the upper portion thereof through a suitable opening. The lower part of chute 16 is V-shaped, Fig. 1, and forms a chamber 19 having an approximately semi-circular bottom with an outlet extending to the right, Fig. 2, in the form of a nozzle or spout 20.

In line with the upper end of chute 16 is mounted a hopper 15, having its lower end fitted with a shut-off gate or valve 18—a operable by a hand crank 18. A telescopic conduit or flexible accordion-like boot 17 is provided for connecting the lower end of hopper 15 with the upper end of chute 16, both of which are suitably flanged for that purpose. Hopper 15 is supported by a frame (not shown) or other means mounted entirely independently of scale 10. Consequently, the weight of hopper 15 and its contents in no way affects the scale. Furthermore, because of the free universal motion permitted by boot 17, no vibration or slight movement can be transmitted from the hopper to chute 16 and the scale.

The mechanism for feeding material from chute 16 into a container is conveniently installed within casing 14 and will now be described.

Rotatably mounted close to the bottom of chamber 19 and extending into the outlet spout 20 is a left-hand screw conveyor 24 formed on or secured to a drive shaft 28, which extends through the left wall, Fig. 2, of chamber 19 and is supported by bearings secured to said wall and to an extension 14—c of casing 14. The conveyor 24 is driven by an electric motor 26 through the medium of a belt 27 and suitable pulleys attached respectively to the motor shaft and shaft 28; the motor being mounted on a channel-like cross-member 14—d secured to plate 14—a of casing 14 and to the side walls thereof.

Supported, also, by cross-member 14—d is a jack shaft 30, which extends through both flanges thereof and plate 14—a, and which is provided with bearings mounted as indicated in Fig. 2. This shaft is driven by a relatively large pulley attached to it, through the medium of a belt 29 and a relatively small pulley secured to shaft 28.

Rotatably mounted in chamber 19 above conveyor 24 is an agitating and spreading device in the form of a steep-pitch, right-hand helix 25 secured to a drive shaft 32, which extends through the left wall, Fig. 2, of chamber 19 and is supported by bearings attached to casing 14 and the extension 14—c thereof. Shaft 32 is driven by a relatively large pulley attached to it, through the medium of a belt 31 and a relatively small pulley secured to jack shaft 30.

The mechanism for jigging or jolting a container to settle and pack the contents thereof will now be described. A frame 34, comprising a sheet-metal plate 34—a, is mounted partially within the recess 14—b of casing 14 and is adapted for to-and-fro vertical movement as will later be explained. A cradle 33 for supporting the bottom of a container 22 such as a valve bag, is secured to plate 34—a by means of a pair of brackets 34—b. Frame 34 is retained in a vertical position and is supported to a limited extent at its upper and lower ends, by four flat springs 35, the right-hand ends of which, Fig. 2, are secured thereto by means of flanges 39; the opposite or left ends of these springs being fastened to brackets 36 and 36—a attached to casing 14.

Fastened to the right-hand end, Fig. 2, of jack shaft 30 is a cam or eccentric 38, which may be of either a plain or anti-friction roller type. A flange 37, welded or otherwise secured to plate 34—a, is adapted to be engaged by cam 38 under certain circumstances, but is normally held clear thereof, as shown in Fig. 3, by means later described.

Container 22 may be of any type and may be constructed of any material, but in the drawings, a well-known form of paper valve bag is shown, same being completely closed or sealed, except for a relatively small opening adjacent its top. Such opening is designed to fit snugly over the outer periphery of spout 20, and is provided with a collapsible valve or flap 21 that is adapted to effectively close the opening after the container has been filled and removed from the spout. As will be noted by reference to Fig. 2, the spout 20 projects a considerable distance into container 22 and, therefore, acts as an effective support for the upper end thereof. A clamping device 23 of known construction is provided for holding container 22 on spout 20 during the filling and jigging operations.

The manually operable control mechanism for starting and stopping the jigging operation and for simultaneously raising and lowering platform 12 of scale 10 will now be described:

Secured, as by welding, to the lower of the two top flanges 39 of frame 34 is a plate 39—a having its left end, Figs. 2 and 3, curved downward so as to form a stop for a roller 42 adapted to bear against said plate for the purpose of supporting frame 34 at certain times. Roller 42 is mounted in a jaw of a short lever 41 secured to a shaft 40 that is carried by bearing members 40—a and 40—b, Figs. 4 and 5, fastened respectively to plate 14—a and the main wall of casing 14. As shown in Figs. 1 and 5, shaft 40 extends through the wall of casing 14 and has a relatively long lever 43 secured to its right-hand end. A rod 45 pivotally connects lever 43 with one end of a lever 47, the opposite end of which is fulcrumed on a pin 48 secured to casing 14. A tension spring 58 having one end attached to casing 14 and its other end attached to lever 47 tends to rotate the latter in a counter-clockwise direction, Fig. 3, about fulcrum pin 48. A projecting pin 49, Fig. 5, fixed in the central portion of lever 47 is adapted to be alternately engaged by the hook-like end of a link 50 and to be freed from contact therewith, in a manner later set forth herein. A slot or an oversize hole in the upper portion of link 50 would, obviously, serve the same purpose as the hook shown in the accompanying drawings.

It should be noted that all of the control mechanism described in the preceding paragraph, except link 50, is supported directly or indirectly by casing 14, which in turn is supported by the weighing platform 12 of scale 10. As will presently be explained, link 50 and all of the mechanism connected with its lower portion is, on the other hand, mounted on and supported by the fixed base or foundation 11 of scale 10. Consequently, contact between pin 49 and link 50 should be interrupted during weighing operations, for otherwise inaccuracies would be caused by frictional and other variable loads that would be brought into action through the movement of platform 12 relatively to base 11 of the scale. Thus, an interruptable contact between pin 49 and link 50, or between other members of the control mechanism, is advisable to the attainment of dependable results.

The lower end of link 50 is pivotally connected by a pin 51 with the central portion of a lever 52 secured to the right-hand end, Fig. 1, of a shaft 53 rotatably carried by supports as at 59 fixed to the base 11 of the scale, as best shown in Figs. 1 and 2. Adjacent to pin 51, lever 52 is provided with a bracket-like extension 56 on which are mounted a set-screw 57 and a roller 72, the purposes of which will later appear. The left end, Fig. 3, of lever 52 is provided with an angular extension 63 and its right-hand end is fitted with a pedal 54.

One end of a tension spring 55 is attached to a projection on link 50 and its opposite end is attached to bracket 56 of lever 52. This spring tends to rotate link 50 in a clockwise direction and thus draw it against set-screw 57 as shown in Fig. 3. It is also apparent from Fig. 3, that, by adjustment of set-screw 57, link 50 may be rotated in either direction about pin 51, and thus be brought into a position to clear pin 49, when lever 52 is in the position illustrated, namely, its upper or release position, into which it may be urged by a compression spring 46 supported on the foundation or base of scale 10. A suitable stop (not shown) may be provided for preventing lever 52 from being moved upward by spring 46 beyond its release position as indicated in Fig. 3.

For holding lever 52 in its lower or operative position as shown in Fig. 4, a locking device is provided, comprising the following. A hook-like lever 71 having a beveled outer edge 71—a at its upper end is secured to the right-hand end, Figs. 3 and 5, of a shaft 75 rotatably supported by a bracket 67 attached to base 11. As will be noted by reference to Fig. 5, lever 71 is located in the same vertical plane as roller 72 and is adapted to engage and hold the latter, when lever 52 is moved downward into its operative position as indicated in Fig. 4. A lever 74 fitted at its outer end with a pedal 68 is secured to the left-hand end, Fig. 5, of shaft 75. Lever 74 has a prong-like extension 69, Fig. 3, which serves to limit or stop the upward movement thereof by abutting against the surface of base 11, as is shown in Fig. 2. A tension spring 70, having its ends attached respectively to base 11 and extension 69, yieldably holds lever 74 in its normal upward position as indicated in Figs. 2 and 3.

From the preceding description, it is evident that pedal 68 provides convenient means for rotating hook lever 71 in a clockwise direction, Figs. 3 and 4, against the tension of spring 70 for the purpose of releasing roller 72 from engagement therewith, when the parts concerned are positioned as shown in Fig. 4.

For raising and lowering platform 12 of the scale, the following mechanism is provided:

A lifting lever 60, having a roller 61 mounted in the jaw of its outer end, is secured to the central portion of shaft 53, Figs. 1 and 3. Immediately above roller 61, a pedestal 62 is secured to the under side of platform 12 and is adapted to be engaged by said roller when lever 60 is rotated by shaft 53 toward a vertical position. Thus, rotation of shaft 53 is controlled by pedal 54, which, therefore, constitutes a convenient means for actuating lifting lever 60. As shown in Fig. 3, when pedal 54 is in its upper or release position, lever 60 is so inclined that roller 61 is out of engagement with the lower surface of pedestal 62, thus leaving platform 12 in its normal weighing position on scale 10. On the other hand, when pedal 54 is in its lower or operative position, as shown in Fig. 4, platform 12 is lifted clear of its supporting members on the scale.

The platform 12 rests in a well known manner upon suitable knife edges 12a which are in operative association with the scale 73. In order to guide the motion of the platform 12 when it is lifted from the knife edges 12a it is preferable to provide, for example, two or more telescopically engaged guide members such as a downwardly extending arm 12b mounted upon the platform 12 adapted for telescopic engagement or axial movement within a suitable recess 12c within the base 11.

In order to retard and thus cushion the descent of platform 12, while it is being lowered through the agency of levers 60 and 52, a dash-pot 66 is mounted on the base 11 or on the foundation on which the latter rests. Dash-pot 66 may be of a known type having a piston 65 and a piston rod 64, the upper end of which is pivotally secured to the outer end of the previously mentioned extension 63 of lever 52.

The operation of the particular example of the present invention, as disclosed in the preceding part of this specification, is as follows:

The opening of valve 21 of an empty, closed-top bag 22 is slipped over the spout 20 and is secured thereto by clamping device 23. The length of the bag or container is such that when thus supported, its bottom rests snugly on cradle 33, with sufficient slack in its body or vertical portion to prevent danger of rupture during the jigging operation, when the cradle is moved rapidly up and down through a short distance in a manner later explained.

It is now assumed that gate 18—a of hopper 15 is closed and that the latter is supplied with loose material by any convenient means in sufficient quantity for fully charging container 22. It is also assumed that the jigging and platform-lifting apparatus with its control mechanism is positioned as shown in Fig. 3. As motor 26 is preferably allowed to run continuously in order to save time, the container filling operation is started by simply opening gate 18—a by means of hand-crank 18, whereupon material falls from hopper 15 through boot 17 into chute 16, entering chamber 19, whence it is ejected by conveyor 24 through spout 20 into container 22. The continuous flow of material during this operation is facilitated by the action of spreading device 25, which rotates in the same direction as conveyor 24, but which tends to move material in a generally opposite direction, because of its right-hand helical construction as compared with the left-hand screw formation of conveyor 24.

At or about the time when the gate of hopper 15 is opened, pedal 54 is moved down by the operator from its release position as shown in Figs. 2 and 3 into its operative position as shown in Fig. 4, thus raising platform 12 clear of its supports on the scale and simultaneously starting the jigging of container 22 and its contents, as will presently be explained.

During the downward movement of pedal 54 and its attached lever 52, roller 72 carried by the latter comes in contact with the beveled edge 71—a of hook lever 71, Fig. 3, and forces it to the right, thus rotating shaft 75 and lever 74 in a clockwise direction against the action of spring 70. This movement continues until the roller passes the point of the hook, which is then snapped over it, Fig. 4, due to the action of spring 70, thus locking lever 52 in its operative position, where it is retained against the combined action of springs 46 and 53, and the load carried by platform 12.

Normally, platform 12 rests on its supports on scale 10, but is raised therefrom by the downward movement of lever 52 which rotates shaft 53 in a clockwise direction, Fig. 3, thus raising roller 61 carried by lever 60 till it contacts pedestal 62 and forces the latter with platform 12 upward, as indicated in Fig. 4, until it is clear of said supports.

When the mechanisms for jigging container 22 and for controlling that operation are positioned as shown in Figs. 2 and 3, the flange 37 of jigging frame 34 is held clear of eccentric 38 by roller 42, which is supported, as previously described, by members carried by casing 14, and which bear against the flanged corner of plate 39—a secured to said frame. It is apparent from inspection of the figures just mentioned, that the load supported by roller 42 tends to retain the latter in the position indicated, because of the over-center inclination of lever 41; this tendency being assisted by spring 58 through the medium of lever 47, rod 45, lever 43 and shaft 40.

When pedal 54 and its attached lever 52 are moved downward by the operator, link 50 is also moved in the same direction, causing engagement of its hook-shaped end with pin 49 carried by lever 47, thus transmitting downward movement to rod 45 and lever 43, which causes shaft 40 and lever 41 to rotate in a clockwise direction, Fig. 3, until they are positioned as shown in Fig. 4. It will now be noted that roller 42 is clear of plate 39—a and that flange 37 of jigging frame 34 rests on eccentric 38, by which it is partially supported; a limited amount of additional support being afforded, as previously explained, by the four flat springs 35, which also effectively retain frame 34 in a vertical position while resiliently permitting up-and-down movement thereof.

As soon as flange 37 is permitted to contact eccentric 38, which is continuously rotated by motor 26, it is apparent that the jigging action of frame 34 and, therefore, of cradle 33 and container 22 with its contents will commence, and that it will continue as long as such contact is maintained, because of the to-and-fro motion of the eccentric.

When container 22 is nearly filled, the operator gradually closes gate 18—a thus shutting off the supply of material from hopper 15 to conveyor 24.

He then presses down pedal 68, thus rotating hook lever 71 in a clockwise direction, Fig. 4, through the medium of shaft 75, until the parts mentioned assume the positions indicated by the broken lines in Fig. 4, thus releasing roller 72 and lever 52. The latter is then moved upward by the combined action of springs 46 and 58 and the load carried by platform 12, the force of which is transmitted through pedestal 62, roller 61, and lever 60 to shaft 53. The upward movement of lever 52 and the coincidental downward movement of platform 12 are, however, retarded and, therefore, cushioned by the action of dash-pot 66.

By reference to Figs. 3 and 4, it is obvious that, because of the type of engagement provided between link 50 and pin 49, the only effect of the upward movement of lever 52 on lever 47 is to leave the latter free to be rotated by other means in a counter-clockwise direction. Consequently, spring 58 is so designed that it has ample force for this purpose and, therefore, as lever 52 moves upward, as previously explained, spring 58 also rotates lever 47 in an upward direction, thus lifting frame 34 through the medium of rod 45, lever 43, shaft 40, lever 41 and roller 42. This lifting movement continues until the frame is brought into its uppermost position as shown in Figs. 2 and 3, with flange 37 clear of eccentric 38, thus stopping the jigging operation. Cradle 33 is also raised sufficiently to relieve stresses that may exist between container 22 and spout 20, which facilitates the subsequent removal of the former from the latter.

After platform 12 moves downward, as above described, and comes to rest on scale 10, the upward movement of lever 52 is continued, through the action of spring 46, until it is arrested in its release or uppermost position by the previously mentioned stop on base 11 provided for that purpose. This brings the hook-like end of link 50 clear of pin 49, as best shown in Fig. 3, and thus interrupts all contact between the portion of the manual control mechanism supported by platform 12, and the portion thereof supported by the base or foundation 11 of said scale. This is desirable in order to prevent interference with weighing operations, as above pointed out. Furthermore, the final upward movement of lever 52 lowers lever 60 sufficiently by means of shaft 53 to bring roller 61 clear of pedestal 62, thus freeing platform 12 of any support therefrom, as shown in Figs. 2 and 3. Scale 10 is now, therefore, ready for the subsequent weighing operation.

Up to this point in the operation of the machine, a charge of material, slightly under the desired weight, has been rapidly and compactly loaded by automatic means in container 22, which is now supported by scale 10 ready for final filling and weighing. These last operations are performed by the operator, who slightly opens gate 18—a of hopper 15 and thus permits material to pass slowly to chamber 19 and thence via conveyor 24 to container 22, until balance beam 73 of the scale indicates that the desired weight of charge is complete, when gate 18—a is promptly closed.

It will be understood that if the scale beam is provided with a supplemental, permanently located weight 73—a, which exactly balances the total tare weight of casing 14 and the attachments supported thereby, including an empty container 22, the true net weight of the charge injected into the latter will be accurately indicated by said beam in the usual way.

It will also be understood that as soon as material passes from hopper 15 into chamber 19 and is supported thereby, its weight is added on scale 10 to that of the material already charged in container 22, even before it reaches the latter, and so is immediately indicated by beam 73 if the point of balance is reached. It is further apparent that all of the material delivered to chamber 19 is quickly transferred into container 22 by the continuously rotating screw conveyor 24. Consequently, when the scale is once balanced and the supply of material from hopper 15 is simultaneously cut off, the balance will be maintained even after the residue of material in chamber 19 is delivered to the container, and the total net weight of the charge loaded into the latter will be the weight steadily indicated by beam 73.

As will be observed, by an inspection of the accompanying drawings, all of the devices necessary to the manual control of the machine shown therein are so located and disposed as to be within clear view and easy reach of the operator, when in a position adjacent container 22. These devices comprise hopper hand-crank 18, clamping device 23, scale beam 73, control pedal 54 and locking pedal 68.

It is now apparent that in the above described form of the present invention there is provided a simple and compact semi-automatic machine for simultaneously loading and jigging a charge of material in a container and for subsequently weighing the charge without moving the container. By providing means for jigging a container while it is being automatically charged, compact loading and rapid operation are assured, and by providing means for protecting the weighing mechanism from vibratory stresses during the jigging operation, any possibility of damage to the scale is prevented.

While the preceding specification illustrates and describes one embodiment of the present invention, it will be evident to those skilled in the art that many alterations and modifications in the arrangement of the apparatus and in the details of design may be made without departing from the spirit and scope of the invention, which, it is desired, shall be limited only by the appended claims and prior art. For example, different types of scales and conveyors may be used instead of those shown herein, and other leverage systems may readily be substituted for those above described, without deviation from the invention.

What we claim is:

1. In combination with a scale and structure supported normally in position to be weighed thereby, a fixture on said structure for fixedly supporting the upper end of a vertically positioned container, a member vibratable relative to said fixture and mounted on said structure for supporting the lower end of said container, a power driven eccentric adapted for operative association with said member for imparting vibratory motion thereto, a lifting device for raising said structure clear of support by said scale and for subsequently lowering it thereon, and a manually operable mechanism for actuating said lifting device and for coincidentally controlling said operative association of said eccentric and member for governing the transmission of said vibratory movement to said member.

2. In combination with a scale and structure supported normally in position to be weighed thereby, a conveyor mounted on said structure, for loading loose material into a vertically positioned container, a loading nozzle fixed to said structure and adapted to support the upper end of said container, a member adapted for reciprocating movement relative to and mounted on said structure for supporting the lower end of said container, power-driven eccentric means adapted for operative association with said member for imparting reciprocating movement thereto, a lifting device for raising said structure clear of support by said scale and for subsequently lowering it thereon, and a manually operable mechanism for actuating said lifting device and for coincidentally controlling transmission of said reciprocating movement to said member.

3. A combination as claimed in claim 2 wherein said reciprocable member is resiliently mounted on said structure.

4. Bag filling, jigging and weighing apparatus comprising platform scales in which the platform normally rests upon knife edges, a bag filling and jigging device mounted upon the platform, pedal operated means to simultaneously lift the platform off of the knife edges and start the jigging operation and to stop the jigging operation and return the platform to the knife edges, said filling device being adapted to fill a valve bag; and the jigging device comprising a constantly driven cam and a bottom support for the bag and means operatively associated with said pedal operated means to lower the support to rest on the cam for jigging operation and to raise the support to stop the jigging action, the lowering of said support occurring when said platform is lifted off of the knife edges and the raising of said support occurring when said platform is lowered to the knife edges.

5. In apparatus for filling valve bags, a filling spout adapted to enter the valve of a bag, a cam rotatable on an axis which is in fixed relation to the spout, a bottom support for the bag beneath the spout, an abutment on the support above the cam, a spring normally raising the support until the abutment is out of contact with the cam, pedal means for counteracting the spring so that the abutment rests on the cam, a catch for holding the pedal in spring-counteracting position, and a pedal for releasing the catch.

6. Apparatus for filling, jigging and weighing a valve bag which comprises platform scales in which the platform normally rests on knife edges, a bag filling device mounted on the scale platform and having a spout adapted to enter the valve of a bag and a constantly rotating cam rotatable about an axis in fixed relation to the spout, a bottom support for the bag having an abutment above the cam, a spring normally raising the support so the abutment does not contact the cam, a pedal, connections from the pedal for raising the platform off of the knife edges when the pedal is depressed, and connections from the pedal for counteracting the spring so that the abutment rests on the cam when the pedal is depressed.

7. Apparatus in accordance with claim 6 and in which the spring-counteracting connections from the pedal comprise a hook on the pedal and pin and lever operatively connected to said support, and means to hold the hook out of contact with the pin when the pedal is raised and in position to contact the pin when the pedal is lowered.

8. In combination with a scale adapted for supporting a valve bag in position for weighing, power driven jigging means for the bag, a lifting device for raising the bag clear of support by said scale and for subsequently lowering it thereon, control means for rendering the jigging means operable or inactive, a manually operable mechanism for operating said lifting device, an interconnection between said manually operable mechanism and said control means whereby the jigging means is coincidentally actuated to jig the bag when the bag is raised clear of the scales, and means for automatically interrupting said interconnection when said container is lowered by said lifting device for support on said scale.

9. In apparatus for filling valve bags, a filling spout adapted to enter the valve of a bag, an eccentric in spaced relation to said spout and rotatable about an axis which is fixed relative to said spout, a bottom support for the bag beneath the spout, an abutment on the support adapted for operative association with said eccentric, resilient means normally urging said support whereby said abutment is held out of operative association with said eccentric, pedal means for counteracting said resilient means so that said abutment is brought into opertive association with said eccentric, a catch for holding the pedal in spring-counteracting position, and a pedal for releasing the catch.

HERBERT J. ZENKE.
EDGAR E. ARNOLD.

REFERENCES CITED

The following references are of record in the file of this patent:

UNITED STATES PATENTS

| Number | Name | Date |
|---|---|---|
| 683,392 | Emming | Sept. 24, 1901 |
| 1,530,118 | Hoepner | Mar. 17, 1925 |
| 1,833,576 | Jaenichen | Nov. 24, 1931 |
| 1,861,443 | Holzapfel | June 7, 1932 |
| 2,205,010 | Hartman et al. | June 18, 1940 |

FOREIGN PATENTS

| Number | Country | Date |
|---|---|---|
| 89,302 | Sweden | Mar. 17, 1937 |
| 476,963 | Germany | May 30, 1929 |
| 665,572 | Germany | Sept. 28, 1938 |